May 11, 1971     W. EVANS     3,578,521

METHOD FOR MAKING FILM CLAD PANELS

Filed July 26, 1967     2 Sheets-Sheet 1

INVENTOR

Wayne Evans

BY

ATTORNEYS

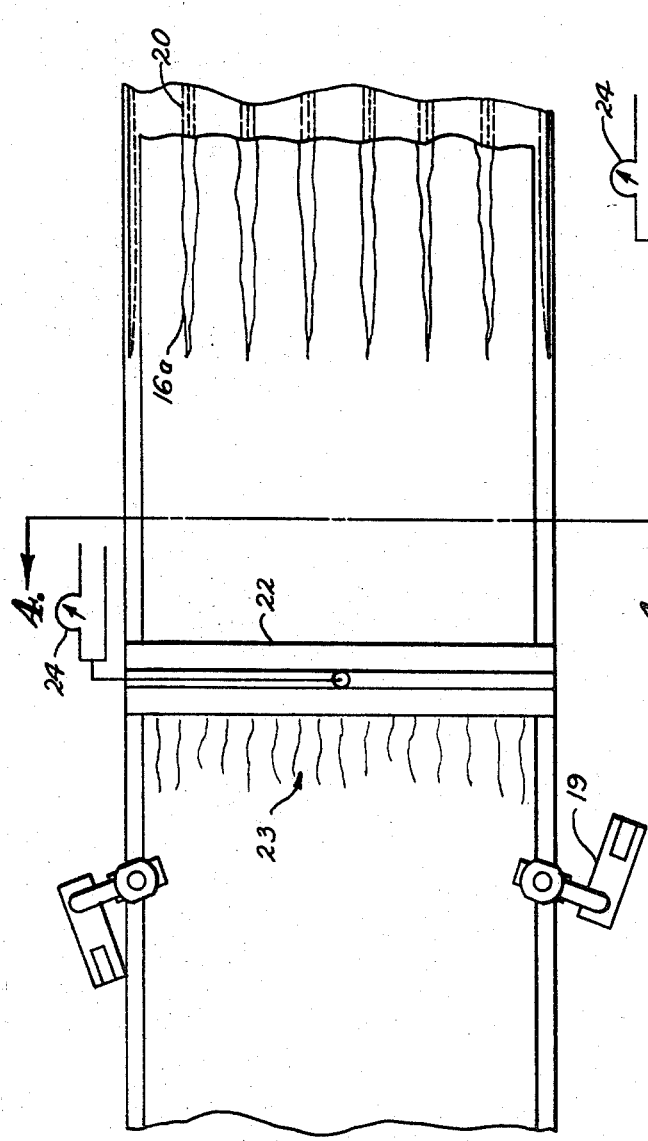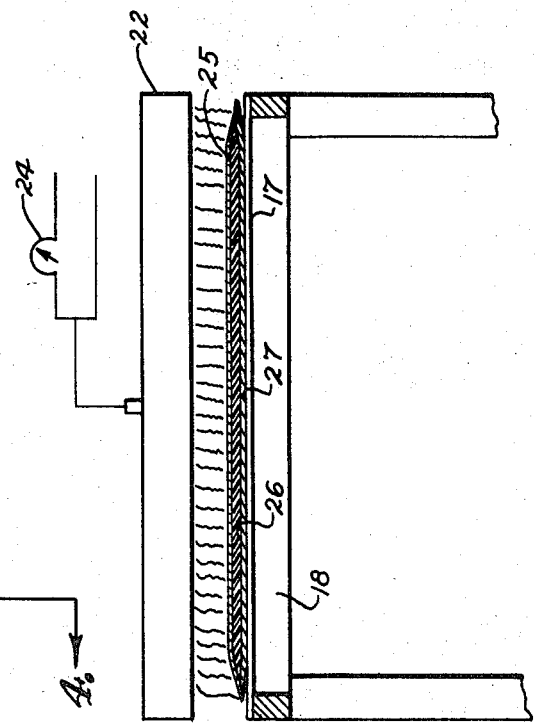

United States Patent Office 3,578,521
Patented May 11, 1971

3,578,521
METHOD FOR MAKING FILM CLAD PANELS
Wayne Evans, Raytown, Mo., assignor to Butler Manufacturing Company, Kansas City, Mo.
Filed July 26, 1967, Ser. No. 656,209
Int. Cl. B32b 31/06
U.S. Cl. 156—84
3 Claims

ABSTRACT OF THE DISCLOSURE

An improvement in the continuous method of fabricating polyvinyl fluoride clad fiber reinforced plastic panels wherein fine wrinkles in the surface of the panels resulting from variations in shrinkage characteristics are removed by subjecting the film to infrared heat after initiation of cure of the plastic and prior to final forming and cure.

BACKGROUND OF THE INVENTION

This invention relates to a method for obtaining an unwrinkled surface or film layer in film clad fiber reinforced plastic panels. These panels are widely used in the construction industry as light diffusers and decorative paneling.

Earliest attempts at utilizing reinforced plastic panels of the type relating to this invention met with limited success due to the relatively short service life of the panels. It was found that degradation of the plastic was accelerated by exposure to the effects of weather, sun and chemical vapors. In an effort to improve service life and performance, various approaches were tried including incorporation into the plastic polymer of chemical stabilizers and other polymer modifying components. The most economical and otherwise satisfactory solution found, however, involved bonding to the exposed surface or surfaces of the panel a thin polyvinyl fluoride film, commonly referred to by the DuPont Corporation trademark, Tedlar. This film is highly inert to weather, most chemicals, and ultraviolet rays, and greatly extends the service life of the panels.

As noted in the Hungerford et al. Pat. No. 3,265,556, a shrinkable grade of polyvinyl fluoride film is used to obtain a smooth surfaced product. Shrinkage in the film is designed to compensate for shrinkage taking place in the resinous inner layer of the panel during resin cure which would otherwise lead to a wrinkled surface. Wrinkles are undesirable since they act as collectors of dirt or other foreign matter which thereby cut down on light transmission and detract from the attractiveness of the panel.

Serious difficulty has been experienced in the continuous manufacture of these panels in achieving the proper amount of shrinkage at the right time. It has been found necessary that the shrinkage of the film not only be balanced in quantity with the shrinkage taking place in the resinous inner layer, but that also both shrinkages take place somewhat simultaneously. Without this time balance it is difficult if not impossible to obtain a wrinkle-free product.

SUMMARY OF THE INVENTION

This invention comprises a method of inducing shrinkage in the polyvinyl fluoride film layer of film clad fiber reinforced plastic panels at the proper stage in the continuous manufacturing process and in the amount necessary to obtain a smooth surfaced product.

An object of this invention is to provide an improved continuous method of providing polyvinyl fluoride film clad reinforced plastic panels with a smooth and glossy surface, free of any wrinkles despite variations in film shrinkage characteristics.

Another object of this invention is to provide a simple and inexpensive method of removing wrinkles in the film layers in the continuous manufacture of polyvinyl fluoride clad film reinforced plastic panels without interrupting the manufacturing cycle.

A further object of this invention is to provide an improvement in the past method of producing polyvinyl fluoride film clad fiber reinforced plastic panels that will yield a wrinkle free product and which can readily be applied in the existing method of production without extensive modifications of equipment and processing techniques.

Other and further objects of the invention together with the features of novelty appurtenant thereto will appear in the course of the following description.

DETAILED DESCRIPTION

In the accompanying drawings, which form a part of the instant specification and are to be read in conjunction therewith and in which like reference numerals indicate like parts in the various views;

FIG. 3 is a greatly expanded fragmentary plan view showing the heating element located over the panel lay-up and demonstrating its effect on panel wrinkles.

FIG. 4 is a sectional view through 4—4 of FIGS. 1 and 3 showing the layers of the panel and showing heat being applied to the panel to induce film shrinkage.

Figure 1:
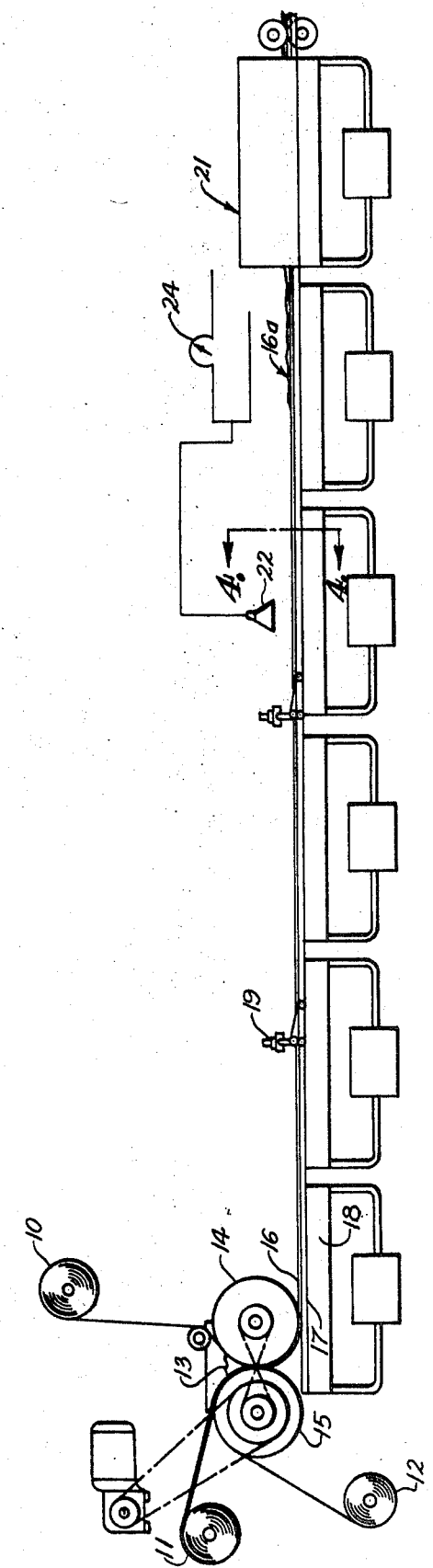
FIG. 1 is a diagrammatic side elevation showing generally a continuous line for fabricating a corrugated panel by a continuous process and capable of carrying out the present innovation.
Figure 2:
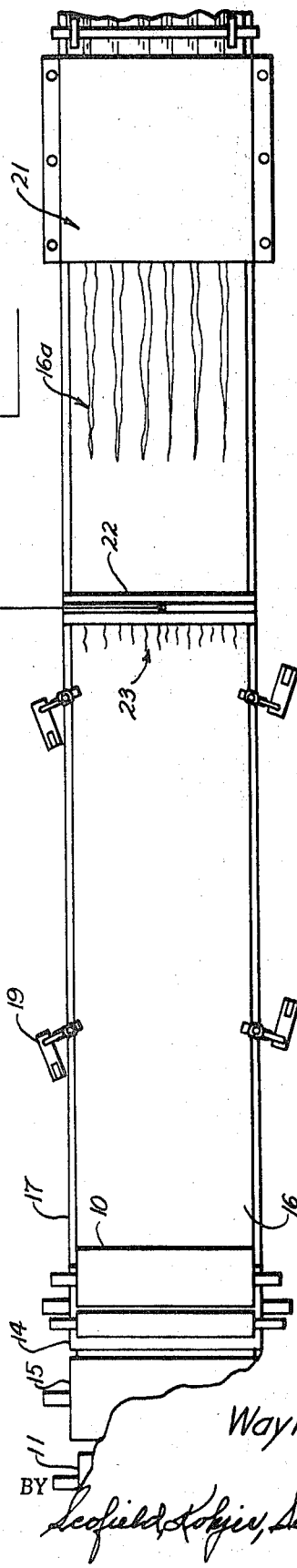
FIG. 2 is a top plan view thereof illustrating the fine wrinkles in the uncured panel and their elimination prior to molding and final cure.

Turning next to the drawings in detail, FIG. 1 schematically illustrates the equipment and materials, exclusive of the finishing operations, required for fabricating corrugated panels of multicomponent composition. The process shown is in general that covered by the Sonneborn et al. patent, No. 3,291,672.

Rolls of polyvinyl fluoride film 10, glass fiber reinforcing mat 11, and cellophane film 12 are fed through a resin bath 13 formed by the tangential approach of two large rollers 14, 15.

The resin bath contains an uncured plastic resin which is usually either an acrylic or a polyester in the viscous liquid state. After saturation of the glass mat with the uncured resin, the cover films and fiber reinforced substrate are brought into intimate contact by being urged between the two cooperatively rotating rollers 14, 15. These rollers also serve to compress the uncured lay-up to a uniform thickness and remove entrained air.

The resultant lay-up 16 is then deposited on a flat metal topped table 17, referred to as the gel plate. The gel plate is heated fom underneath by a plurality of water tanks 18 containing circulating hot water. As the lay-up is advanced along this plate, the temperature is gradually increased thereby initiating the cure of the resinous substrate. After the cure has advanced to the state where the polymer takes on a gelatinous consistency, the lay-up can be formed into the configuration of the final product.

Auxiliary to the process but not necessary to this invention are the Mount Hope rollers 19 which are used to keep the lay-up flat. When the humidity and film condition are proper these rollers can be eliminated.

In the embodiment of the invention shown in the drawings, corrugated panels are being formed. The corrugations are initiated at the downstream end of the gel plate 17 as shown at 16a, by passing the lay-up over forming shoes 20 as shown in FIG. 3. The shape of these shoes can be varied dependent upon the pattern of panel desired and can be eliminated entirely for flat panels. Immediately adjacent the forming shoes is the molding section 21 which contains upper and lower scows or molding plates contoured to match the desired panel configuration. Heat is also applied in the molding section so that the cure of the plastic resin is substantially completed therein. Final cure is accomplished in a post cure oven (not shown) after which the panels are ready for trimming and cutting to final dimension.

The process thus far described is basically that disclosed in Sonneborn et al. patent, No. 3,291,672. However, there are no provisions in that patent for specifically handling the heat shrinkable film with which this invention is particularly concerned. The continued application of supplemental heat to the film in the section of the process over the gel plate, referred to generally as the gel section, will eliminate fine wrinkles on the surface of the panels caused by an imbalance between the shrinkage taking place in the outer film layer and the inner resin layer. The nature and type of heat required is not controlling although an infrared heat lamp 22 as shown in the drawings has been found to be especially effective. It can be readily controlled and can be directed onto the lay-up with a minimum heat loss to the surrounding atmosphere.

The location of the heat source and the temperature achieved has been found to be critical. After controlled experimentation and development, it was found that the heat must be applied to the lay-up as it is being transported over the gel plate and after the initiation of resin cure but prior to the lay-up reaching the forming shoes 20. Also it is imperative that the effects of heat adjustments be visually observable since it is impossible to predict the exact temperature necessary to obtain the required shrinkage. Each lot of polyvinyl fluoride film and each batch of plastic resin has its own shrinkage characteristics within limits and it is necessary that shrinkage of the plastic resin and the film be balanced. Since it is impossible to predict the exact shrinkage of any particular lot of film or batch of plastic resin without considerable expense and time loss, it is necessary to be able to handle variations by adjusting the process while observing the effects of the adjustments on the panel lay-up.

FIG. 3 demonstrates the readily discernible results of applying controlled heat to the lay-up in the gel section. Wrinkles observable at 23 are completely eliminated after passing under the heat lamp 22 which thereby visually shows the correctness of the heater settings.

A rheostat type controller 24 is utilized to control output of the infrared heating element 22 in the embodiment of the invention shown. It is anticipated that a more simple on-off type controller would also suffice since it is expected that the residual heat in the lamp would dampen any cyclic output to within tolerable limits.

Although it remains a trial and error process at arriving at individual heater settings for each lot of polyvinyl fluoride film material, it has been found that film temperatures required immediately below the lamp will fall within the range between 130 and 170° F. By controlling heater output it is possible to achieve a relatively close control of the film temperature and thus obtain the degree of shrinkage desired.

FIG. 4 shows the heat lamp radiating heat onto the panel lay-up. It can be noted that heat is applied to the entire width of the panel. The panel is shown in section so that the upper layer of polyvinyl fluoride film 25, the inner layer of resin saturated fiber reinforcing 26 and the lower layer of cellophane film 27 can be distinguished.

In this figure the corrugations or other configurations have not as yet been introduced since this view is taken prior to the lay-up passing over the forming shoes.

It can be seen from the above that this invention provides a necessary and novel improvement of considerable value in the previously accepted method of continuous fabrication of polyvinyl fluoride film clad fiber reinforced plastic panels. It makes possible the utilization of film possessing a broader range of shrinkage characteristics while still obtaining a uniformly smooth surfaced product. Thus material costs are substantially reduced, scrap production is decreased, and a higher quality of product is obtained.

From the foregoing it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. In the continuous method of fabricating polyvinyl fluoride clad fiber reinforced plastic panels which includes the steps of drawing a lay-up of uncured plastic resin and heat shrinkable polyvinyl fluoride film through a gel section wherein cure of the resin is initiated by the application of heat and then carrying the lay-up through a forming zone, the improvement in said method of temporarily applying additional heat from a supplemental source directly to the advancing film subsequent to the initiation of the resin cure and prior to the panel lay-up being carried into the forming zone, said heat so controlled that the temperature of the film is raised to a value at which shrinkage taking place in the film balances the shrinkage accompanying cure of the plastic resin thereby removing any fine wrinkles in the surface of the panels.

2. The improvement in the method as in claim 1, wherein the temperature to which the polyvinyl fluoride film is raised by the addition of supplemental heat is some value between 130° and 170° F.

3. The improvement in the method as in claim 1, wherein the supplemental heat source is an infrared heat lamp with a controlled variable output such that the heat added can be adjusted until any fine wrinkles in said heat shrinkable film as viewed prior to entry into said forming zone are caused to disappear.

References Cited

UNITED STATES PATENTS

| | | | |
|---|---|---|---|
| 2,774,704 | 12/1956 | Smith | 161—189 |
| 3,044,913 | 7/1962 | Lundberg | 161—195X |
| 3,265,556 | 8/1966 | Hungerford et al. | 156—288X |
| 3,291,672 | 12/1966 | Sonneborn et al. | 156—289 |

BENJAMIN R. PADGETT, Primary Examiner

S. HELLMAN, Assistant Examiner

U.S. Cl. X.R.

156—85, 288, 289